UNITED STATES PATENT OFFICE.

HENRY S. GRISWOLD, OF PHOENIX, ARIZONA TERRITORY.

TIRE-HEALING COMPOUND.

974,134.

No Drawing.

Specification of Letters Patent.   Patented Nov. 1, 1910.

Application filed July 16, 1910.   Serial No. 572,380.

*To all whom it may concern:*

Be it known that I, HENRY S. GRISWOLD, a citizen of the United States, residing at Phoenix, in the county of Maricopa and Territory of Arizona, have invented certain new and useful Improvements in Tire-Healing Compounds, of which the following is a specification.

My present invention relates to tire healing compounds and more particularly to a fluid composition adapted to be introduced into a pneumatic tire to heal small punctures and the like, my object being to provide a composition embodying a minimum number of inexpensive ingredients which may be mixed without the necessity of any tedious operation or complicated apparatus, which is not injurious to the rubber or fabric of the tire, but acts as a preservative thereof, and which may be readily removed from articles of clothing.

To this end my invention consists of a tough and elastic base of a gummy or glutinous character, preferably gum tragacanth, to which is added a tough resilient flour, preferably flour of slippery elm, which I have found to be admirably adapted for this use, with the possible exception of its tendency to spoil. This is, however, offset by the addition of the third ingredient which is "asepsin," a trade-name for an antiseptic compound manufactured by Lloyd Bros., of Cincinnati, Ohio. This latter ingredient is a fragrant preservative which will keep the composition in a soft and pliable state and will prevent putrefaction or bacterial formation. The last ingredient is water, enough of which is added to bring the composition to the desired consistency.

I have found that one fourth of an ounce of "asepsin" is sufficient for a mixture of four ounces of gum tragacanth and sixteen ounces of flour of slippery elm, to which I add about five gallons of water.

I claim:

1. A tire healing compound comprising water, flour of slippery elm, a glutinous material, and an antiseptic preservative.

2. A tire healing compound comprising water, flour of slippery elm, gum tragacanth, and an antiseptic preservative.

In testimony whereof I affix my signature in presence of two witnesses.

HENRY S. GRISWOLD.

Witnesses:
 WM. H. SARGENT,
 THEODORE NOACK.